W. WILSON.
Collar.
No. 197,807.         Patented Dec. 4, 1877.
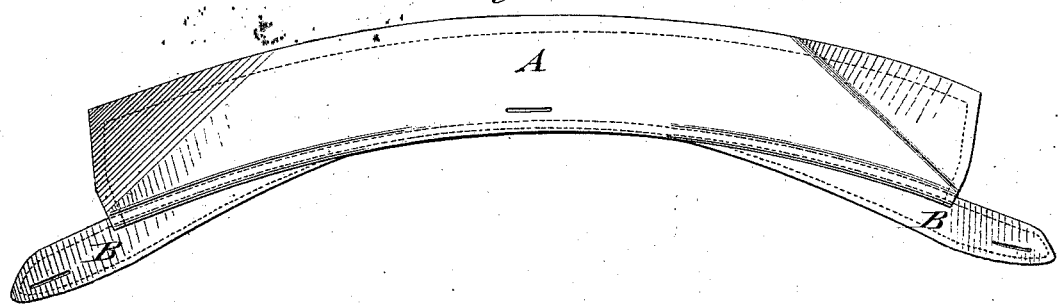
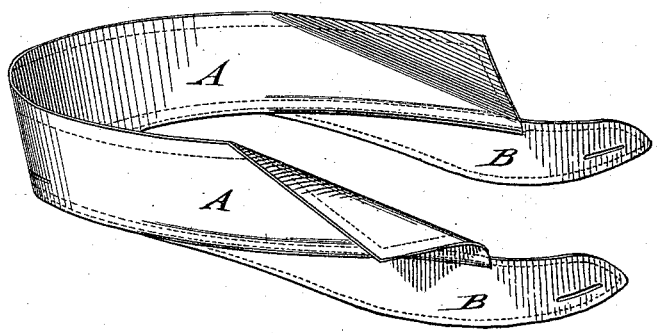

UNITED STATES PATENT OFFICE.

WASHINGTON WILSON, OF NEW YORK, N. Y.

IMPROVEMENT IN COLLARS.

Specification forming part of Letters Patent No. 197,807, dated December 4, 1877; application filed November 8, 1877.

*To all whom it may concern:*

Be it known that I, WASHINGTON WILSON, of the city, county, and State of New York, have invented a new and Improved Collar, of which the following is a specification:

In the accompanying drawings, Figure 1 represents a side elevation of my improved collar, and Fig. 2 a perspective view of the same.

Similar letters of reference indicate corresponding parts.

This invention refers to an improved standing collar that retains all the advantages of the old-style curved band, without the objection of springing the collar too far from the neck, so as to come in contact with the coat and soil the collar. The collar also hugs the neck-band in such a manner that the collar is prevented from overriding it, resulting in a more comfortable fit.

The invention consists of a standing collar having sectional bands, starting from center of collar, or any other point between center and ends, and continuing with a graduated curve to and beyond the ends of the collar.

Referring to the drawing, A represents a standing collar of my improved construction, and B the short or sectional bands, which start from the center of collar, or any other point between the center and ends, and continue along the lower part of the same, with a graduated curve and increasing width to and beyond the ends of the collar, in the same manner as in ordinary bands.

The bands B are made either to overlap the collar proper, or the collar is made to overlap the bands, or one part of the bands lap over the collar ends, while the remaining part is overlapped by the collar, so as to obtain smoothly-covered joints at both meeting ends of collar and sectional bands.

The bead formed by the connection of collar and band may also be continued, if desired, along the lower edge of that part of the collar between the bands, and thereby a more ornamental appearance imparted to the same.

The use of the short or sectional bands produces a saving of material, as compared to the old style of continuous band, and furnishes a collar that hugs the neck-band in superior manner, without springing back so as to come in contact with the collar.

Having thus described my invention, I claim as new and desire to secure by Letters Patent—

A collar, A, having sectional bands B, starting from the center of the collar, or any point between the center and ends thereof, and continuing with a graduated curve to and beyond the ends of the same, substantially as described and shown, and for the purpose set forth.

WASHINGTON WILSON.

Witnesses:
PAUL GOEPEL,
C. SEDGWICK.